Figure 1:
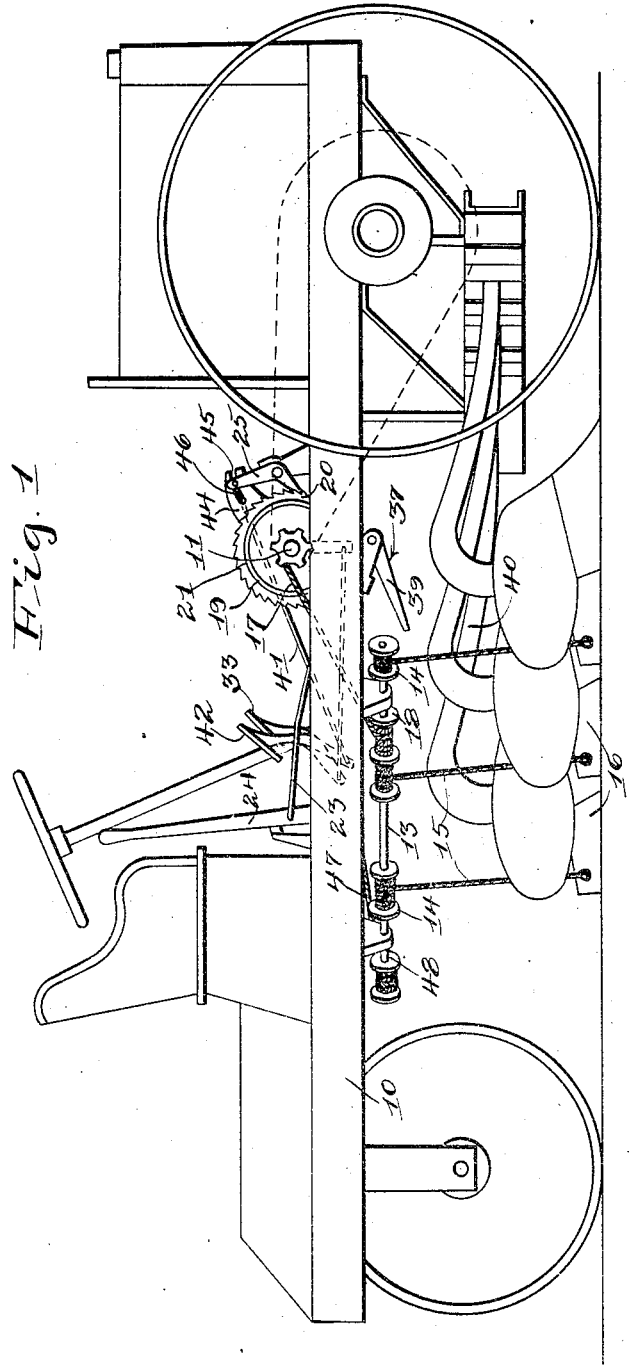

L. S. HACKNEY.
PLOW LIFT FOR GANG PLOWS.
APPLICATION FILED MAY 31, 1912.

1,104,187.

Patented July 21, 1914.
2 SHEETS—SHEET 1.

Witnesses
F. C. Caswell
F. M. Hardy

Inventor
Leslie S. Hackney
by John E. Stryker Atty

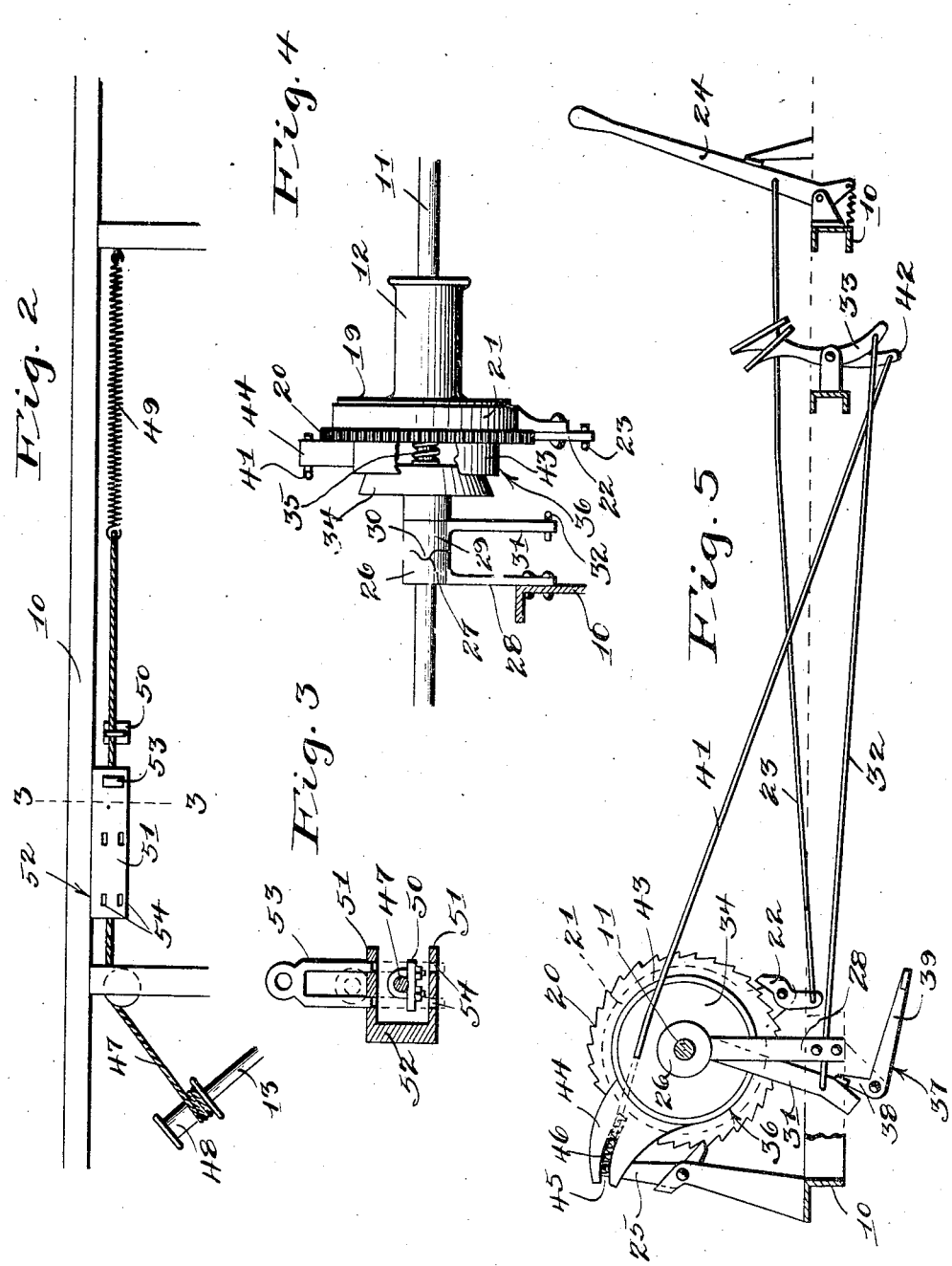

UNITED STATES PATENT OFFICE.

LESLIE S. HACKNEY, OF ST. PAUL, MINNESOTA.

PLOW-LIFT FOR GANG-PLOWS.

1,104,187.

Specification of Letters Patent.

Patented July 21, 1914.

Original application filed August 14, 1911, Serial No. 643,922. Divided and this application filed May 31, 1912. Serial No. 700,655.

*To all whom it may concern:*

Be it known that I, LESLIE S. HACKNEY, a citizen of the United States, residing at St. Paul, in the county of Ramsey and State of Minnesota, have invented new and useful Improvements in Plow-Lifts for Gang-Plows, of which the following is a specification.

My invention relates to improvements in plow lifts for gang plows. Its object is to provide simple and efficient means for raising a series of plows manually or by power, and for lowering and controlling the same in their downward movement.

A further object is to provide in such a device means for automatically stopping the upward movement of the plows when elevated by power and adjustable means for limiting the downward movement of said plows.

This application is a division of an application for patent on motor plows, Serial Number 643,922 filed by me on August 14, 1911.

In the drawings Figure 1 is a side view of a motor plow showing my improved mechanism in operative connection with a gang of plows; Fig. 2 is a plan view in detail of the mechanism for limiting the downward movement of the plows; Fig. 3 is a sectional view taken on the line 3—3 of Fig. 2; Fig. 4 is a plan view in detail of my improved lifting mechanism and Fig. 5 is an end elevation of the same.

Referring to the accompanying drawings, I have used the reference numeral 10 to indicate the frame of a traction vehicle. The power shaft 11 is arranged on the frame 10 and is provided with a spool 12 loosely mounted thereon. The drum shaft 13 is revolubly mounted beneath the frame 10 and is provided with a plurality of drums 14. Cables 15 are severally attached to each of the plow bodies 16 and extend to drums 14 above the plow bodies to which they are respectively connected. The cable 17 is wound at one end on the spool 12 and at its other end about the drum 18 on the shaft 13. The rotation of the spool 12 in one direction winds the cable 17 thereon and rotates the drum shaft 13, thus winding the cables 15 on the drums 14 and raising the plows. The rotation of said spool 12 in the opposite direction permits the unwinding of the cables 15 from the drums 14, thus lowering the plows.

Means are provided for manually rotating the spool 12 to raise the plows. For this purpose said spool is provided with a drum 19 and ratchet 20. The collar 21 is loosely mounted on the drum 19 and supports the dog 22. This dog is connected by the rod 23 to the hand lever 24 and normally rests out of engagement with the ratchet 20. The rearward movement of the lever 24 causes the engagement of said dog 22 and ratchet 20, and the continued reciprocation of said hand lever turns the spool 12 to raise the plows. The dog 25 on the frame 10 engages the ratchet 20 and prevents the rotation of said spool to lower the plows. Means are also provided for rotating the spool 12 by power to raise the plows. To this end, the collar 26, having a recess 27 in its face, is loosely mounted on the power shaft 11 and is held from rotation thereon by the arm 28 which is fixed to the frame 10. The collar 29 having a cam 30 conforming with said recess 27 is loosely mounted on said shaft and is provided with an arm 31, said arm being connected by the rod 32 to the pedal 33. The clutch driving member 34 feathered on the shaft 11 is held by the spring 35 from engagement with the clutch driven member 36 on the spool 12 and in a position adjacent to the collar 29. By pressing the pedal 33 the cam collar 29 is turned and the movement of the cam 30 in the fixed recess 27 causes a lateral separation of the collars 26 and 29, when the latter is rotated on the power shaft 11, and causes the engagement of the clutch members 34 and 36 against the action of the spring 35 whereby the spool 12 is revolved to raise the plows. The spring 35 returns the collar 29 to its normal position and disengages the clutch members 34 and 36 when the pedal 33 is released.

A safety stop to limit the upward movement of the plows when raised by power is provided and comprises a bell crank 37 pivotally connected to the frame 10. Said crank is arranged with one crank arm 38 in the path of the arm 31 on the cam collar 29 and its other crank arm 39 in the path of one of the plow beams 40. When the arm 39 is moved upwardly by said plow beam the crank arm 38 strikes the arm 31 and moves the cam collar 29 back into its normal position against the pressure on the pedal 33, brought to bear by the operator in raising the plows, thus disengaging the clutch members 34 and 36 to stop the rotation of the spool 12.

The plows fall by gravity when released, and their movement is controlled as follows: The dog 25 which prevents the rotation of the spool 12 in a direction to lower the plows is connected by the rod 41 to the pedal 42. The outer periphery of the clutch driven member 36 forms a drum 43 and on this drum is mounted a brake shoe 44 having a slot 45. The rod 41 which is connected to the dog 25 extends into this slot 45. The spring 46, arranged within the shoe 44, engages the rod 41 and yieldingly holds said shoe in position on the drum 43 and the dog 25 in engagement with the ratchet 20. A slight movement of the pedal 42 disengages the dog 25 from the ratchet 20 and releases the plows, while a further movement of said pedal engages said brake shoe with the drum 43 to control the speed of the plows in their downward fall. I have also provided means for limiting the downward movement of the plows. For this purpose, the cable 47 is wound at one end about the drum 48 on the shaft 13 and is connected at its other end to a spring 49. The attachment of the cable 47 to the drum 48 is such that the rotation of the shaft 13 to lower the plows turns said drum in a direction to wind said cable. The spring 49 which is fixed to the frame 10 keeps the cable 47 taut regardless of the rotation of the drum 48. The clamp 50 on the cable 47 moves between the flanges 51 of the support 52 and engages the stop 53 as the plows are lowered. This stop is adapted to be set in any of the pairs of perforations 54 in the flanges 51, and thus limits the working depth of the plows.

In the operation of my device, the operator presses the pedal 33 to raise the plows by power, the elevation of said plows being automatically discontinued by the operation of the crank 37 which disengages the clutch members 34 and 36. The hand lever 24 is reciprocated to rotate the spool 12 and thereby raise the plows by hand. The stop 53 is adjusted in the flanges 57 to limit, as desired, the downward movement of the plows.

Having described my invention, what I claim as new and desire to protect by Letters Patent is:

1. In a device of the class described, the combination of a frame carrying plows, a drum shaft on the frame, drums on said shaft, a cable for each plow attached at one end thereto and wound at its other end on one of said drums, means for turning said shaft to wind said cables on their respective drums to raise said plows, a cable attached at one end to one of said drums and connected at its other with said frame, said cable being arranged to be wound upon its drum as the plows are lowered and adapted to stop the rotation of said drum shaft, thus limiting the fall of said plows.

2. In a device of the class described, the combination of a frame carrying plows, a drum shaft on the frame, drums on said shaft, a cable for each plow, attached at one end thereto and wound at its other end on one of said drums, means for turning said shaft to wind said cables on their respective drums to raise said plows, a spring on the frame, a cable attached at one end to said spring and wound at its other end on one of said drums and means for stopping the movement of said cable whereby the rotation of said drum shaft is discontinued and the fall of the plows limited.

3. In a device of the class described, the combination of a frame carrying plows, a drum shaft on the frame, drums on said shaft, a cable for each plow attached at one end thereto and wound at its other end on one of said drums, means for turning said shaft to wind said cables on their respective drums to raise said plows, a spring on the frame, a cable attached at one end to said spring and wound at its other end on one of said drums, a clamp on the cable, a support on the frame, a stop adjustable in said support and adapted to engage said clamp and limit the movement of said cable in one direction.

4. In a device of the class described, the combination of a frame carrying plows, a spool revoluble on said frame, a drum shaft on the frame, drums on said shaft, a cable connecting said spool and one of said drums, a cable connecting each plow with one of said drums, means for rotating the spool to raise said plows, means for locking the spool to hold said plows in elevated position, and adjustable means for discontinuing the rotation of the drum shaft in lowering the plows to thereby limit their working depths.

5. In a device of the class described, the combination of a frame carrying plows, a spool revoluble on said frame, a drum shaft on the frame, drums on said shaft, a cable connecting said spool and one of said drums, a cable connecting each plow with one of said drums, means for rotating the spool to raise the plows, a spring on the frame, a cable attached at one end to said spring and wound at its other end on one of said drums, and means for stopping the movement of said cable whereby the rotation of said drum shaft is discontinued and the fall of the plows limited.

6. In a device of the class described, combination of a frame carrying plows, a spool revoluble on said frame, a drum shaft on the frame, drums on said shaft, a cable connecting said spool and one of said drums, a cable connecting each plow with one of said drums, means for rotating the spool to raise said plows, a spring on the frame, a cable attached at one end to said spring and wound at its other end on one of said drums, a clamp on the cable, a support on the frame, a stop adjustable in said support and adapted to engage said clamp and limit the movement of said cable in one direction.

In testimony whereof, I have signed my name to this specification in the presence of two subscribing witnesses.

LESLIE S. HACKNEY.

Witnesses:
ASHLEY COFFMAN,
J. KAVANAGH.

Copies of this patent may be obtained for five cents each, by addressing the "Commissioner of Patents, Washington, D. C."